United States Patent [19]

Bekiarian et al.

[11] Patent Number: 5,076,659
[45] Date of Patent: Dec. 31, 1991

[54] PROCESS FOR THE STABILIZATION OF FLUOROPOLYMERS

[75] Inventors: Paul G. Bekiarian, Claymont, Del.; Marlin D. Buckmaster; Richard A. Morgan, both of Vienna, W. Va.

[73] Assignee: E. I. du Pont de Nemours and Company, Wilmington, Del.

[21] Appl. No.: 541,693

[22] Filed: Jun. 21, 1990

Related U.S. Application Data

[62] Division of Ser. No. 199,443, May 27, 1988, Pat. No. 4,946,902.

[51] Int. Cl.$^5$ ............................................. G02B 6/00
[52] U.S. Cl. ................................... 385/143; 385/145; 385/144
[58] Field of Search ............................ 350/96.30-96.34

[56] References Cited

U.S. PATENT DOCUMENTS

| | | | |
|---|---|---|---|
| 3,674,758 | 7/1972 | Carlson | 525/326.2 |
| 4,599,386 | 7/1986 | Carlson et al. | 525/326.2 |
| 4,946,902 | 8/1990 | Bekiarman et al. | 525/326.2 |

Primary Examiner—Akm Ullah
Attorney, Agent, or Firm—Paul R. Steyermark

[57] ABSTRACT

Melt-processible copolymers of at least two halogenated comonomers from a defined class, especially perhalogenated comonomers, and particularly perfluorinated comonomers, of improved thermal stability are obtained by first contacting the copolymers with a stabilizing agent selected from bases (ammonia or amines) having a boiling point at normal pressure of at most 130° C. and tertiary alcohols having up to 8 carbon atoms, to form an intermediate, drying the intermediate at about 70°–150° C., and fluorinating the intermediate at a temperature between 20° C. and the lowest temperature at which the copolymer exhibits a solid state transistion, then removing excess fluorine and by-products and recovering the stabilized copolymer. Such stabilized copolymers are useful for a variety of technically important applications, including as cladding for optical fibers, substrates for electronic components, thermal laminates, pipes, tubes, and fittings, etc.

14 Claims, 1 Drawing Sheet

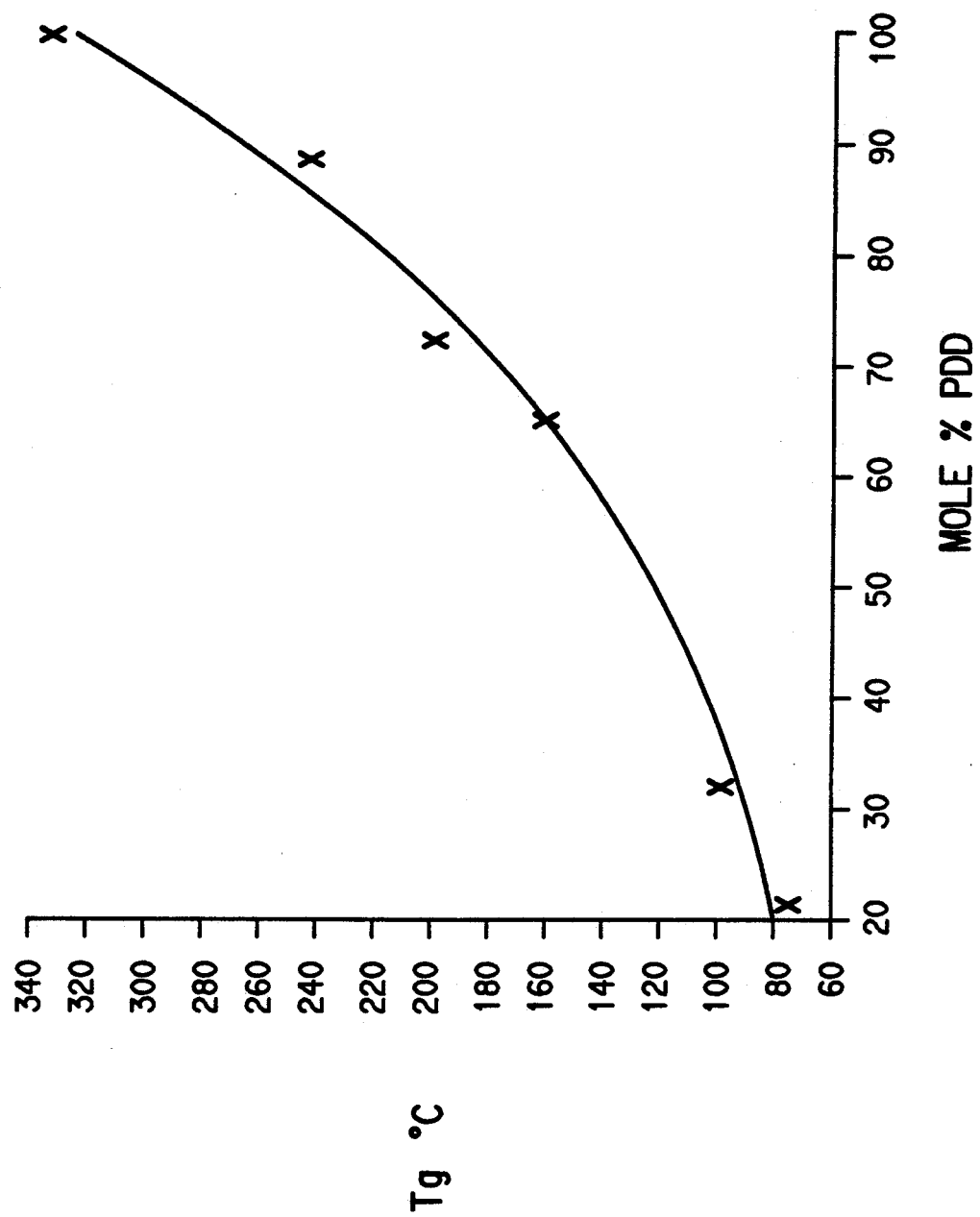

PROCESS FOR THE STABILIZATION OF FLUOROPOLYMERS

This is a division of application Ser. No. 07/199,443, filed May 27, 1988, now U.S. Pat. No. 4,946,902.

BACKGROUND OF THE INVENTION

This invention relates to a process for the stabilization of certain fluoropolymers, especially those useful in many high technology applications such, e.g., as electronic equipment and optical fibers.

Many fluoropolymers are known in the art. They include especially various copolymers of two or more comonomers such as, for example, tetrafluoroethylene (TFE), hexafluoropropene, chlorotrifluoroethylene, perfluoro(methyl vinyl ether), and perfluoro(2,2-dimethyl-1,3-dioxole) (PDD).

Such copolymers often are melt-processible and thus can be fabricated at high temperatures. However, they frequently suffer some deterioration during high temperature processing and thus lose some of their desirable properties such as, for example, good optical clarity. This thermal deterioration can be traced to the presence of various labile end groups, such as, e.g., carboxyl (—COOH) and fluorocarbonyl (—COF). The former tends to eliminate carbon dioxide at high temperatures, while the latter, while more thermally stable, nevertheless tends to hydrolyze in the presence of moisture, which normally cannot be completely avoided, and is converted to carboxyl groups. Such hydrolysis also results in the the evolution of hydrofluoric acid which is corrosive to most materials of industrial importance, including many metals, glass and quartz.

The removal of unstable end groups has long been an important part of the technology of perfluorihated melt-processible copolymers of TFE. Schreyer, U.S. Pat. No. 3,085,083, treated such polymers "with water, preferably in the presence of inorganic compounds having a pH of at least 7, such as stable bases,--- at a temperature of 200°-400° C., and recovering a fluorocarbon polymer having at least half of all the end-groups in the form of difluoromethyl groups". However, polymers with difluoromethyl end groups, —CF2H, are inferior for use in optical fibers because of their absorption of light at certain wavelengths.

Buckmaster et al., U.S. Pat. No. 4,675,380, teach the fluorination of melt-processible TFE copolymers which have been coagulated by stirring in the presence of a mineral acid and a water-immiscible liquid and then isolated. The total number of unstable end groups was reduced to less than 80 per $10^6$ carbon atoms.

U.K. Patent 1,210,794 to Du Pont discloses the fluorination of fluorocarbon copolymers to reduce the number of unstable end groups. When using the copolymers of interest in the present invention, the process of that patent employed a fluorination temperature of at least 225° C. to remove all unstable end groups. The patent makes no specific mention of —COF end groups, which have since been found to be the most difficult groups to fluorinate.

Anderson et al., U.S. Pat. No. 4,594,399, discloses perfluoro(2-methyl-1,3-dioxole) and its copolymers.

Squire, U.S. Pat. No. 4,399,264, discloses perfluorodioxole and its copolymers.

Squire, U.S. Pat. No. 4,530,569, discloses amorphous copolymers of PDD and optical fibers clad with these copolymers.

Core/cladding optical fibers described in U.S. Pat. No. 4,530,569 have good heat resistance. Example 11 of that patent describes a fused silica optical fiber clad with an amorphous PDD/TFE copolymer, which had an optical attenuation of 113 dB/Km. While adequate for some uses, this is not adequate for long distance transmission of light signals. Normally, a loss of more than 20 dB/km is undesirable in some applications. Thus, while a fiber with attenuation of 20 dB/km can be used for distances up to about 1000 m, a fiber with attenuation of 113 dB/km would be useful for distances up to about 180 m, and a fiber with attenuation of 2000 dB/km would still be useful for distances up to about 10 m Numerous applications for optical/electric switch sensors involve distances of 10 m or less, e.g., in microwave ovens, copy machines, chemical reactors, and furnaces, but lower attenuation makes an optical fiber more broadly useful.

Melt-processible copolymers containing multiple bonds, e.g., carbonyl groups, may be unsuitable for optical fibers, because multiple bonds absorb light of certain wavelengths. Multiple bonds in perhalogenated polymers can be destroyed by fluorination at or above 200° C.

While fluorination of fluoropolymers reduces the concentration of multiple bonds and unstable end groups, complete fluorination requires high temperatures, usually above 200° C., to remove substantially all —COF groups. However, when the polymers soften or begin melting at the fluorination temperature, such a process causes agglomeration of polymer particles, which leads to difficulties in their further handling and processing.

Furthermore, high temperature fluorination can cause equipment corrosion.

It is, therefore, desirable to make possible fluorination of fluoropolymers at temperatures not exceeding 200° C., and in any event below temperatures at which the fluoropolymers melt or significantly soften.

SUMMARY OF THE INVENTION

According to this invention, there is now provided a process for improving the high temperature stability of a melt-processible copolymer of at least two comonomers selected from the group consisting of tetrafluoroethylene; chlorotrifluoroethylene; RfCF=CF2, where Rf is a primary fluoroalkyl group with 1-5 carbon atoms; RgOCF=CF2, where Rg is Rf or a primary fluoroalkyl group containing ether oxygen and 4-12 carbon atoms; and a fluorodioxole having the following formula

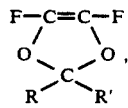

where each one of R and R' independently is fluorine or the trifluoromethyl group;

said process comprising at least one cycle of the following sequential steps:

(a) contacting said copolymer for a period of at least about 15 minutes at a temperature between about 25° C. and 200° C. with at least a stoichiometric amount, based on the concentration of any —COOH and —COF groups present in the copolymer, of an anhydrous or aqueous stabilizing agent selected from the group consisting of
  (1) bases selected from the group consisting of organic amines having a boiling point at normal pressure of at most 130° C. and ammonia, and
  (2) tertiary alcohols with up to 8 carbon atoms, to form an intermediate;
(b) isolating and drying the intermediate at a temperature between about 70° C. and 150° C.:
(c) converting the dried intermediate to a copolymer having improved thermal stability by contacting the intermediate with fluorine at a temperature between 20° C. and the lowest temperature at which the copolymer exhibits a solid state transition, whether first order or second order, and
(d) removing excess fluorine and volatile by-products from the reaction product and recovering the copolymer.

BRIEF DESCRIPTION OF THE DRAWING

The drawing represents the relationship between Tg and the mole fraction of PDD in the dipolymer with TFE, as determined by X-ray fluorescence.

DETAILED DESCRIPTION OF THE INVENTION

The fluorinated copolymers of interest in the process of the present invention may be predominantly crystalline, predominantly amorphous, or completely amorphous. Many such copolymers are known from the technical or patent literature. Copolymers which have significant crystalline character exhibit a definite melting temperature, which is often referred to as a "first order transition". Copolymers which have significant amorphous character exhibit at least one glass transition temperature, usually designated by Tg, which is referred to as a "second order transition." Amorphous copolymers may exhibit several glass transition temperatures, but for the purpose of the present description and claims, the lowest such temperature is of principal interest. Similarly, copolymers which have significant crystalline character may, in addition to a melting temperature, also have one or more glass transition temperatures. For the purpose of the present description and claims, the lowest such temperature, whether melting or glass transition, is of principal interest. It is preferred that the amorphous copolymers of this invention have only a single Tg.

All the copolymers used in the process of the present invention are melt-processible. For the purpose of the present description and claims, the term "melt-processible" means that the polymer can be fabricated into shaped articles such as films or fibers in melt processing equipment such as, e.g., extruders or injection-molding equipment.

In the preferred RfCF=CF$_2$ comonomer, Rf is is a perfluoroalkyl group, especially CF$_3$. In the preferred RgOCF=CF$_2$ comonomer, the preferred Rg group is a perfluoroalkyl group, especially —CF$_3$ or —CF$_2$CF$_2$CF$_3$, or an oxygen-containing perfluoroalkyl group. PDD is a preferred comonomer. Its amorphous copolymers with TFE are useful in a number of applications, particularly as cladding for optical fibers. The copending allowed application Ser. No. 904,095 of E. N. Squire, filed Sept. 4, 1986, discloses a class of particularly preferred amorphous copolymers of PDD which have high Tg's. Those amorphous PDD copolymers are soluble at room temperature in perfluoro(2-butyltetrahydrofuran), available from 3M Company under the trademark FC-75 ®, and have a number of other outstanding properties, including high modulus, high strength, melt fabricability, unusually low refractive indices in the range of 1.29 to 1.40, excellent dielectric properties, high chemical stability, and low water absorption. To the extent necessary, the disclosure of application Ser. No. 904,095 is incorporated herein by reference.

Further, the most important property of these PDD copolymers to optical fibers is their transparency to the usual wavelengths of light to be transmitted.

As discussed in the copending application Ser. No. 904,095, these amorphous PDD copolymers are also suitable for a number of other applications, including optical lenses, electronic components such as, e.g., circuit boards, thermal laminates, pipes,
  tubes, and fittings, etc.

It has been shown in application Ser. No. 904,095 that, as the amount of PDD in the amorphous copolymers with TFE increases, the Tg also increases, although not necessarily in a linear fashion. It is preferred that the amorphous copolymers used in the process of the present invention have a Tg of at least 125° C.

One of the most important uses for the amorphous copolymers, especially amorphous PDD copolymers stabilized by the process of the present invention is in optical fibers, as the cladding. An optical fiber with a plastic core and a plastic cladding has good flexibility, and optical fibers of this type are now widely used in the field of optical communications, for example, for factory automation and short-distance communication in vehicles such as automobiles, and as optical information media in large-scale display devices.

Optical fibers comprising polymethyl methacrylate or polycarbonate as the core and a vinylidene fluoride/tetrafluoroethylene copolymer or a fluoroalkyl methacrylate polymer as the cladding have heretofore been used for such purposes. However, these optical fibers have poor heat resistance and resistance to bending. On the other hand, certain stabilized perhalo copolymers of the present invention are particularly suitable for making optical fibers having excellent properties, including operability at elevated temperatures. The process of this invention makes it practical to substantially eliminate —COF and other multiple bonds in perhalocarbon polymers which soften at or below 200° C.

The starting copolymers which are to be stabilized by the process of this invention have —COF end groups and may also contain —COOH end groups, which are easier to remove than —COF end groups. In particular, TFE/PDD copolymers having a Tg above the copolymerization temperature tend to have —COF end groups, which can form either during or after polymerization.

While the inventors do not wish to be bound by any interpretation of the end group chemistry, they believe that the reaction of amines or ammonia with the —COF groups leads to either amine salts or amides, both of which are more readily fluorinated than —COF groups are. The amine salts are the more readily fluorinated. The presence of water and the use of secondary or tertiary amines are preferred since these conditions promote the salt formation. It is not known how tertiary alcohols react with —COF end groups to remove those end groups, though some carboxyl end groups are found after treatment with a tertiary alcohol. It may be that t-alkyl esters are made and then pyrolyzed with the loss of an olefin and $CO_2$.

Copolymerization of suitable monomers to the starting copolymers to be stabilized according to the process of the present invention is conducted in a generally known manner. The initiator must be non-telogenic, which means that it does not cause a reduction of the molecular weight of the copolymer below the desired level. Redox initiators such as ammonium persulfate/$SO_3^=$, $BrO_3^-/S_2O_5^=$, $HOCl/SO_3^=$, and others can be used. These initiators can be used at any convenient temperature, since the generation of free radicals occurs when the two components react.

Persulfates such as, for example, ammonium persulfate and potassium persulfate; peroxides such as, for example, disuccinyl peroxide; and mixtures of persulfates and peroxides can also be used as initiators. In the case of nonaqueous copolymerization, initiators soluble in organic solvents can be used.

Each initiator is used at a temperature such that its decomposition results in the formation of free radicals at a convenient rate. These temperatures are known in the art.

The reaction medium is preferably water. It is desirable to use a non-telogenic dispersing agent to maintain the copolymer in dispersion during the polymerization. Suitable dispersing agents are known in the art; typical ones are the ammonium salts of perfluorooctanoic acid and perfluorononanoic acid. The selection of the initiator and dispersing agent is not critical except as described above.

In order to obtain an optically homogeneous copolymer, especially in a semi-batch process, it is desirable to have a substantially constant concentration of free radicals and ratio of monomers present. This makes it possible to make a copolymer having a substantially constant composition. Another way to obtain constant composition is to use a continuous polymerization, especially when operating on a rather large scale.

One way to achieve substantially constant free radical concentration is to use redox initiators, which produce free radicals as fast as they are mixed together. Another way to achieve a sufficiently uniform free radical concentration is to add initiator continuously while polymerizing at a temperature at which the initiator half-life is short.

The initial ratio of comonomers charged to the reactor is selected to provide a copolymer with the desired glass transition temperature and thus a predetermined comonomer content. This initial ratio can be readily calculated from the respective reactivities of the comonomers.

As the semi-batch polymerization progresses, additional monomers are added to maintain the substantially constant reaction environment. These additions may be made continuously or in frequent batch additions.

These additions of monomers and initiator should continue until the polymerization is at least 60% complete, preferably until it is at least 80% complete, and ideally until it is complete. If the additions of comonomers continue until the polymerization is about 80% complete, further polymerization will not significantly change the ratio of comonomers present. One skilled in the art will be able to adjust the conditions and rates of addition so as to obtain a copolymer having constant composition.

The polymerization pressure is not critical and is determined largely by the temperature, amount of the less reactive comonomer desired in the product, and the desired rate of polymerization.

The copolymers can be isolated after aqueous copolymerization by coagulating the dispersion by stirring that is more vigorous than that used during copolymerization. Coagulating agents can be employed in a manner generally described in U.S. Pat. No. 4,451,616 to Kawachi et al. and U.S. Pat. No. 4,368,296 to Kuhls et al. Or the coagulation method used in U.S. Pat. No. 4,675,380 to Buckmaster et al. can be used, giving a non-water-wet copolymer in the form of small particles such as grains or small pellets.

Usually, if a water-immiscible liquid is added to the gel, the amount of water-immiscible liquid is 0.25 to 3.0 parts per part of copolymer on a dry weight basis. Preferably, the water-immiscible liquid should have a surface tension of not more than 5 dynes/cm at 25° C., and it should have a normal boiling point in the range of 30° to 150° C. Typical examples of the immiscible liquid suitable in the process of this invention are aliphatic hydrocarbons such as hexane, heptane, gasoline and kerosene, or mixtures thereof; aromatic hydrocarbons such as benzene, toluene and xylene; halogenated hydrocarbons such as carbon tetrachloride, monochlorobenzene, the trichlorotrifluoroethanes, difluorotetrachloroethanes, and liquid oligomers of chlorotrifluoroethylene. Following the formation of copolymer particles as a result of stirring with one of the above organic liquids, the organic liquid is removed by the application of heat and/or reduced pressure. At this stage, the copolymer particles are essentially no longer water-wettable. The particle size depends to some extent on the particular organic liquid used and the ratio of its weight to the copolymer.

Nonaqueous polymerization also can be carried out in a constant environment, producing a copolymer having constant composition. Some copolymers made in a nonaqueous medium also contain —COF end groups, and they too can be stabilized by the process of this invention.

COPOLYMER STABILIZATION

Base Option

In this option, the aqueous dispersion is coagulated, optionally gelled, e.g., by addition of an amine or ammonium hydroxide, or concentrated nitric acid, or some other electrolyte, and a water-immiscible liquid may be added to the gel with continuing agitation. The gel breaks into separate phases of water and non-water-wetted copolymer particles.

The principal reaction of the copolymer —COF groups with a base to facilitate a subsequent fluorination step can be carried out either on filtered and dried copolymer or directly on the copolymer-water mixture obtained in the polymerization step. Suitable bases, in addition to ammonia, include, i.a., propylamine, butylamine, diethylamine, dipropylamine, triethylamine, 2-ethylbutylamine, piperidine, morpholine, and pyridine. All these organic amines have good water solubility and adequately high boiling point to prevent their premature loss during coagulation. Low molecular weight and high water solubility of the amines increase their rate of reaction with (or rate of diffusion into) the copolymer. Ammonia, diethylamine, and butylamine provide faster reaction, while pyridine, triethylamine, and piperidine react more slowly. The rate of reaction also increases with the temperature, which preferably should not exceed the Tg of the amorphous copolymer. Amines can form amine salts or amides with the —COF groups, but the presence of water promotes the formation of salts.

After the reaction with base is completed, preferably at 75°-150° C., the copolymer particles are separated from the aqueous phase, optionally washed to remove excess base, and dried at about 70°-150° C., but below the Tg of the amorphous copolymer, preferably at a reduced pressure and with a purge of inert gas such as, e.g., nitrogen.

Off-gases should be handled with care since toxic hexafluoroacetone and perfluoroisobutylene may be formed by the decomposition of the copolymer.

As an alternative, the reaction with base can be carried out in a separate step after copolymer coagulation and drying. In that case, it is preferably at about 75°-150° C. until no absorbance at 1883 cm$^{-1}$ is evident in a Fourier transform infrared spectroscopy scan of a compression molded copolymer film. The amount of base should be at least stoichiometric, based on the amount of —COF and —COOH groups, but a larger amount is more convenient. The reaction rate increases with excess base. There is no critical upper limit for this excess.

Following the reaction with base, the copolymer is separated from the base by any convenient means, such as, e.g., filtration, centrifugation, evaporation of base, etc., and dried at 70°-150° C., but not above the Tg of amorphous copolymer. When ammonium hydroxide is the base, a drying temperature over 150° C. could cause regeneration of acid fluoride groups.

Tertiary Alcohol Option

The aqueous dispersion made in the polymerization step is coagulated with agitation or gelled by agitating with an electrolyte, then isolated and dried. As in the amine option, a water-immiscible liquid may be added to the gel in the isolation step.

The next step is contacting the dried copolymer, preferably in a finely divided state, with a tertiary alcohol. A water-soluble tertiary alcohol is preferred to facilitate its removal by washing and drying. Tertiary butyl alcohol is most preferred.

The amount of tertiary alcohol must be at least stoichiometric, based on the COOH and COF groups, and the alcohol is typically present in excess. The amount of the excess is not critical, and it is convenient to use enough of the alcohol to slurry the copolymer.

The reaction is carried out at 25°-200° C., preferably at a temperature from 40° C. below Tg of the copolymer to 50° C. above Tg, but below the decomposition temperature of the alcohol. Use of a temperature too far below Tg will retard swelling of the copolymer and penetration by the tertiary alcohol. The Tg can be lowered for the purpose of this reaction by adding a plasticizer such as ClF$_2$C—CCl$_2$F. Perfluoro(2-butyltetrahydrofuran) or a similar perfluorinated solvent, when used in a small amount, will produce the same effect. Use of a temperature above Tg is likely to cause the copolymer particles to lump together, so Tg is the most preferred upper temperature limit.

The reaction time depends on the temperature chosen and should be long enough to decrease the concentration of —COF groups in the copolymer to the desired level, preferably to zero. Typically, 6-8 hours is adequate. Pressure is not critical and can be atmospheric or autogenous.

The alcohol is then removed in any convenient manner, for example, by washing with a volatile solvent for the alcohol, filtration, and drying to constant weight. The solvent may be a polar organic solvent. In the case of t-butyl alcohol, the solvent can be water. The drying conditions are not critical; drying overnight at 100° C. is typical.

Flourination

Fluorination at the lower end of the temperature range requires longer times, but the reaction should be continued at the temperature chosen until the desired removal of functional groups is achieved. Fluorination not only removes color, but also appears to destroy residual —COOH, —H, —COF (at higher temperatures), CF=CF$_2$, and —SO$_3$H groups, as well as the amides, amine salts, and esters of tertiary alcohols produced in the earlier stage. In the case of dioxole copolymers, particularly TFE/PDD, it is desired to reduce —COF end groups to less than 5, preferably less than 2 meg/kg copolymer. If undesired end groups remain after one cycle of the process of the invention, another cycle can be carried out.

An important advantage of the present invention is that it permits removal of —COF groups and stabilization of amorphous copolymers which have Tg's below 200° C.

The concentration of the fluorine gas fed to the reactor is not critical. A concentration of 10-25% (by volume) in an inert gas such as nitrogen is preferred for fluorination of amine salts. The presence of inert gas prevents an excessively fast reaction leading to excessive temperatures.

Optical Fibers

As the core component of the optical fibers according to the present invention clad with a PDD copolymer, it is possible to use polymethyl methacrylate, polystyrene, bornyl methacrylate polymers, polycarbonates, fluoroalkyl methacrylate polymers, fluorostyrene polymers, alpha-fluoroacrylate polymers, polymers having glutaric imide units represented by the following formula:

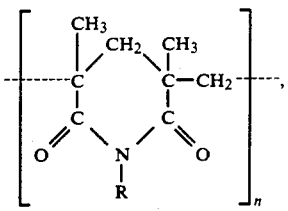

where R stands for a lower alkyl, a cycloalkyl, or phenyl;

crosslinked silicone polymers, crosslinked acrylate polymers, poly-4-methylpentene-1, crosslinked fluorine polymers, polyallyl dicarbonate, fluorinated silicone polymers, quartz glass and silica glass. The preparation of the glutaric imide polymers is described in Sasaki et al. U.S. Pat. No. 4,693,553.

The core/cladding optical fiber of the present invention is prepared by a coextrusion process or by coating the core with the cladding copolymer.

In preparing the optical fiber of the present invention, especially the plastic core optical fibers, by the coextrusion process, the amorphous PDD copolymer should have a melt viscosity of not higher than 30,000, preferably not higher than 20,000, most preferably not higher than 10,000 poises at a shear rate of 100 sec$^{-1}$ as measured at 250° C. The core component and cladding component must be selected so that the melt flow rate of the core component, as determined under a load of 4 kg/cm$^2$, is less than the melt flow rate of the cladding component. Under these conditions, a core/cladding optical fiber having a truly circular cross-section and excellent light-transmitting properties can be obtained. The cladding copolymer preferably should have a Tg of at least 125° C., especially at least 135° C., and most preferably at least 150° C. When such high Tg cladding copolymers are used in optical fibers with a heat-resistant core, the resulting clad optical fibers are suitable for high temperature applications such as, for example, for transmitting information from monitoring devices in the automobile engine compartment to the dashboard.

Test Methods

The weight percent recurring units of TFE and PDD in their copolymer can be determined by x-ray fluorescence (XRF). This was the technique used to generate the plot of mole % PDD vs. Tg of the Drawing for PDD/TFE copolymers, and the plot was later used to estimate PDD content from Tg. Measurements were made on a Philips Electronic Instruments 1404 XRF spectrometer. Samples were in the form of 50 mm diameter disks approximately 1 mm thick. Calibration of x-ray fluorescence intensity as a function of weight % oxygen and fluorine was accomplished using three copolymer samples of known composition which bracketed the anticipated fluorine and oxygen content of the unknown PDD-TFE copolymers. These standards were PDD homopolymer, a copolymer of 40 weight % of perfluoro(methyl vinyl ether) with 60 weight % of tetrafluoroethylene, and a copolymer of 96.1 weight % of tetrafluoroethylene with 3.9 weight % of perfluoro(propyl vinyl ether). The compositions of the latter two polymers were determined by infrared spectroscopy with calibration by accurate determination of off gases during polymerization.

The analytical crystal used had an effective d spacing of approximately 5.0 nm. The fluorine fluoescence intensity maximum was at $43.5° = 2\theta$ and the oxygen intensity maximum at $57.1° = 2\theta$. Five TFE/PDD copolymers of unknown composition spanning the composition range of approximately 20 to 90 mole % PDD were analyzed by XRF. Ten replicate determinations of a sample containing 63.7 wt % fluorine and 11.2 wt % oxygen (corresponding to 71.9 mole % PDD, 28.1 mole % TFE) gave a root mean square variance of 0.34% relative in fluorine and 1.9% relative in oxygen.

Copolymers other than PDD/TFE copolymers are examined by infrared spectroscopy, which confirms their expected copolymer structure.

First-order transitions (crystalline melting points) and second-order transitions (glass transition temperatures) were determined by differential scanning calorimetry (DSC) according to ASTM D 3418-82. Some of the Tg values were determined using a Du Pont Thermal Analyzer, model 1090, with either a model 910 or 912 DSC module. Other Tg values were determined using a Du Pont model 9900 Thermal Analyzer with a model 910 or 912 DSC module. Temperature was calibrated using a two-point method with lead and indium as standards. Samples were run at 20° C./minute using a sample size of 10–20 mg. Tg was taken as the onset of the slope change (Tf in FIG. 2 of ASTM D 3418-82). The melting temperature, Tm, was taken as the peak temperature, as in FIG. 1 of ASTM D 3418-82.

Acid fluoride group concentration in TFE/PDD copolymers was measured by Fourier transform infrared spectroscopy (FTIR). Copolymer samples were prepared for measurement by compression molding a film between 51 and 255 micrometers thick at a temperature approximately 100° C. above the Tg of the copolymer. The molded film was mounted and placed in a Perkin-Elmer model 1750 or Nicolet Model 5DX FTIR spectrometer and scanned for multiple scans between 4000 and 450 cm$^{-1}$ at a resolution of 2 cm$^{-1}$. The resulting spectrum was then plotted with expanded abscissa in absorbance mode. The band at 1929 cm$^{-1}$ was used as an internal thickness band. Absorbance for this band was measured using a baseline drawn between about 1980 cm$^{-1}$ and 1890 cm$^{-1}$. Acid fluoride was determined from the absorbance at 1883±2 cm$^{-1}$, with the baseline for this band being drawn between about 890 cm$^{-1}$ and 1858 cm$^{-1}$. The ratio of the absorbance at 1883 cm$^{-1}$ to the absorbance at 1929 cm$^{-1}$ was defined as the "acid fluoride index" (AFI):

AFI = $A_{1883}/A_{1929}$, where $A_{1883}$ = absorbance at 1883 cm$^{-1}$ and $A_{1929}$ = absorbance at 1929 cm$^{-1}$ The acid fluoride band at 1883 cm$^{-1}$ was calibrated using perfluoro(2,2-dimethyl-4-fluoroformyl-1,3-dioxolane) as a model compound. Five solutions, having known concentrations in the range of 10–250 milliequivalents of acid fluoride per kilogram in perfluoro(1-butyltetrahydrofuran) were made up and absorbances determined with a Perkin-Elmer 1750 FTIR spectrometer using the acid fluoride band at 1887 cm$^{-1}$. The thickness band at 1929 cm$^{-1}$ was calibrated by measuring the absorbance as a function of film thickness for copolymer samples having thicknesses between 51 and 510 micrometers. It was found from these calibrations that $$C = 12.3 \times AFI,$$

where C is the concentration of acid fluoride (—COF) groups in milliequivalents per kilogram of copolymer, and AFI is the above acid fluoride index.

A relative measure of carboxylic acid group concentration in TFE/PDD copolymers was obtained by (FTIR). Copolymer samples were prepared as before and scanned in the same equipment and in the same manner. The resulting spectrum was then plotted in absorbance mode. The band at 1929 cm$^{-1}$ was used as an internal thickness band, and absorbance for this band was measured as before. Carboxylic acid was determined from the absorbance at 1810±2 cm$^{-1}$, with the baseline for this band being drawn between about 1830 cm$^{-1}$ and 1800$^{-1}$. The ratio of the absorbance at 1810 cm$^{-1}$ to the absorbance at 1929 cm$^{-1}$ was defined as the "carboxylic acid index" (CAI):

CAI = $A_{1810}/A_{1929}$, where $A_{1810}$ = absorbance at 1810 cm$^{-1}$ and $A_{1929}$ = absorbance at 1929 cm$^{-1}$.

End group analyses for fluoropolymers not containing the dioxole ring were made as disclosed in U.S. Pat. No. 4,675,380 to Buckmaster et al.

Melt viscosity was determined with an Instron Constant Rate Capillary Rheometer according to the principles outlined in Dealy, "Rheometers for Molten Plastics", Van Nostrand Reinhold, N.Y. (1982). The apparatus consisted of an Instron 1123 test frame, load cell and rheometer barrel. The load cell read the load generated by the piston forcing copolymer melt through a cylindrical orifice. It was capable of making accurate measurements from 4.45 to 8900N; in practice, however, readings less than 45N were never used in calculations due to anomalous factors such as drag of the piston on the barrel wall reducing the accuracy of the measurement. The test frame was capable of generating piston velocities of 0.0025 to 50 cm/minute. Both the load and piston velocity were automatically recorded by an IBM PCXT personal computer. The rheometer barrel was cast from Stellite alloy but otherwise was of standard design. It was 0.953 cm in diameter, 40.6 cm long, adn electrically heated to $250\pm0.5°$ C. The tip of the piston was precisely machined to get a clearance of 13 micrometers from the barrel. A capillary orifice with 0.079 cm diamter and 1.27 cm length was intimately attached to the rheometer barrel to ensure thermal equilibrium with it. The capillary was fabricated from Armco 17-4 stainless steel to a Rockwell hardness of 38–40. The diameter was sized with test pins to ensure its measurement within 13 micrometers. If a complete flow curve was desired (viscosity measured over a shear rate range of about 1 to 10,000 $sec^{-1}$), about 10 grams of sample was charged to the barrel and compressed by hand. The piston was attached to the test frame and allowed to rest on the copolymer surface for 5 minutes while the sample came to thermal equilibrium. At this point, rather than forcing the copolymer out of the barrel by steadily increasing the piston velocity, a random sequence of velocities was selected. This separated the potential effects of time and test rate on the measurements. Apparent viscosity, apparent shear rate and shear stress at the capillary wall were computed from the load on the piston, piston velocity, capillary length and diameter, plus the barrel diameter. Equations to make these calculations can be found in standard texts such as J. M. Dealy, Rheometers For Molten Plastics, Van Nostrand-Reinhold, New York (1982). In most cases, only the viscosity at 100 $sec^{-1}$ was required. For this case, only 5 grams of copolymer was loaded in the barrel and piston velocities of 0.0401, 0.401, 4.01, and 0.0401 cm/minute were selected, in that order, to get measurements at 10, 100, 1000, and 10 $sec^{-1}$, respectively. Bracketing the required shear rate in this way helped to assess the validity of the measurement. Every other part of the procedure was as outlined above.

Melt index was determined according to ASTM D 1238.

Refractive index was measured according to ASTM D-542-50, refractometer method.

The emitted light quantity retention ratio is a measure of the performance of an optical fiber when bent. Light is passed from one end of a fiber to the other end and the emitted light quantity AO is measured. Then the fiber is wrapped around a 10 mm rod 100 times and the emitted light quantity A is measured. The ratio A/AO is the emitted light quantity retention ratio.

The present invention will now be described in detail with reference to the following representative examples of certain preferred embodiments thereof, wherein all parts, proportions, and percentages are by weight unless otherwise indicated. The abbreviation "meq" stands for "milliequivalent" or "milliequivalents".

EXAMPLE 1

A 36 liter horizontal polymerization kettle equipped with a paddle type agitator was charged with 21.8 kg of demineralized water and heated to 60° C. The polymerization kettle was evacuated and pressured to a slight positive pressure with TFE. The evacuation followed by TFE addition was repeated a second time, and then the polymerization kettle was evacuated a third time. To the evacuated polymerization kettle were added 35 g of ammonium sulfite and 80 g of Asahi Glass "Surflon" Sllls fluorosurfactant (which is substantially ammonium perfluorononanoate) dissolved in 1000 ml of demineralized water.

With the agitator at 60 rpm, 757 g of liquid PDD was pressured into the polymerization kettle to give a pressure of 55 kPa. Then, TFE was added to a pressure of 131 kPa. After both monomers were added, 100 ml of ammonium persulfate (APS) solution (70 g/l) was added rapidly, and then its addition was continued throughout the polymerization at a rate of 2 ml/min. After 41 minutes, a 34 kPa pressure drop had occurred, indicating that polymerization had started. From this point, PDD monomer was added at a uniform continuous rate of 1665 g/hour and TFE at a rate of 353 g/hour until a total of 4080 g of PDD had been added after the initial pressure drop; then, addition of both monomers was stopped. After a further pressure drop of 20 kPa occurred, the ammonium persulfate addition was stopped; the polymerization kettle was vented; and the contents were recovered.

A 26.1 kg portion of the cooled product dispersion, which contained 15.3% copolymer solids, along with 4.5 kg of demineralized water, was transferred into a 106 liter steam-jacketed, stainless-steel coagulator equipped with a 23 cm (tip to tip) 45° angle, four-bladed turbine agitator. The agitator was turned on at 350 rpm, and 57 g of diethylamine was added. The dispersion gradually thickened into a gel. After 30 minutes, 2200 ml of $CFCl_2$—$CF_2Cl$ (Du Pont Freon ® 113 fluorocarbon) was poured slowly into the coagulator. The gel immediately separated into copolymer and water phases. After the agitator was shut off and settling occurred, the water was drawn off and the copolymer was washed twice with 22.7 kg portions of fresh water for 10 minutes while agitating at 250 rpm. After removal of the second wash water, 34 kg of fresh demineralized water was added and the reactor contents were heated slowly to 55° C. to boil off the Freon ®113. When Freon ® 113 evolution ceased, the copolymer and water were drained from the bottom of the coagulator and filtered. The recovered copolymer was dried in a 120° C. vacuum oven. This copolymer, designated Copolymer A, had a Tg of 166° C.

A portion of Copolymer A was placed in a chamber which was evacuated, purged with nitrogen, and then heated to 160° C. A 25/75 v/v fluorine/nitrogen gas mixture was then passed over the copolymer for 6.5 hours while maintaining the 160° C. temperature. The gas flow amounted to 0.027 part of fluorine per part of copolymer. The chamber was then purged with nitrogen and cooled, and the copolymer granules were removed from the chamber. Analysis showed the copolymer to have an acid fluoride content of 1 2.9 meq/kg copolymer.

About 1100 parts of the above fluorine-treated copolymer were contacted with 2500 parts of demineralized water and 30 parts of diethylamine at 20° C. for about 16 hours and then at about 80° C. for four hours. The copolymer was collected and dried in a 120° C. vacuum oven for three days. Analysis showed no detectable acid fluoride. This copolymer was then again exposed to fluorine as in the procedure described above. The copolymer was heated at 130° C. under a vacuum for four hours after removal from the fluorination chamber to assure total elimination of any residual fluorine. Analysis of the isolated copolymer indicated an acid fluoride content of 3.9 meq/kg copolymer and an inherent viscosity of 0.65 dl.g. This copolymer was designated Copolymer B.

EXAMPLE 2

A separate portion of copolymer A after its first fluorination was heat-treated in moist air at 325° C. for 66 hours, and the fused resin was broken up in a blender using a small amount of water as a lubricant. The copolymer was dried to constant weight at 50° C. under a nitrogen purge. This resin was exposed to gaseous fluorine at 160° C. for 6.5 hours using the above-described procedure. The amount of fluorine passed through the reactor was 0.053 part per part of resin. The isolated copolymer was shown to contain 5.0 meq of acid fluoride per kg of copolymer.

The sample was further purified by dissolving in distilled perfluoro(2-butyltetrahydrofuran) (2.5-3.5 % solids) at approximately 50° C. and filtering at room temperature using a coarse fritted glass funnel. The solution was then concentrated to a viscous solution (20%-50%) using a rotary evaporator. The solvent recovered from the rotary evaporator was reused to dissolve additional quantities of copolymer. The viscous solution was poured into several aluminum trays and the remaining solvent evaporated over 2-3 days in a "clean room" supplied with filtered air under positive pressure. The copolymer was removed from the trays, vacuum dried at approximately 100° C. with nitrogen purge, and ground into a granular form. This copolymer was designated C.

EXAMPLE 3

The same polymerization kettle, water charge, temperature, agitator rpm, and evacuation and TFE purge procedure were used as in Example 1. After the evacuation and purge, 5 ml of cyclohexane as a chain transfer agent and 80 g of Asahi Glass "Surflon" Sllls surfactant plus 35 g of ammonium sulfite in 1000 ml of demineralized water were added. PDD monomer (660 g) and 50 ml of APS (70 g/l) were added, and the APS addition was continued at 6.5 ml/minute until the start of polymerization was indicated by a 34 kPa pressure drop. After polymerization started, APS addition rate was reduced to 2 ml/minute, and addition of PDD monomer at a rate of 1815 g/hr and of TFE at a rate of 405 g/hour were started. When a total of 3795 g of PDD had been added after the start of polymerization, addition of both monomers was stopped. After a further 20 kPa pressure drop occurred, the polymerization kettle was vented and the product was removed.

This copolymer dispersion was coagulated, and the copolymer was isolated as described in Example 1, except that the diethylamine gelling agent was replaced with concentrated nitric acid (0.022 part/part of copolymer). The dried copolymer had a Tg of 162° C. A portion of this copolymer was then contacted with a 25/75 v/v mixture of fluorine and nitrogen at 160° C. for six hours as described above. The product from this fluorination had an acid fluoride content of 20 meq/kg copolymer. This resin was then contacted at about 80 with water and diethylamine at a polymer/water/diethylamine ratio of 1/4.5/0.06 for 24 hours and then at 20° C. for 24 hours. The copolymer was collected on a filter, washed with demineralized water, and dried in a 120° C. vacuum oven for 48 hours.

A film of this resin showed no infrared absorbance at 1883 cm$^{-1}$ attributable to acid fluoride, but showed a large absorbance at 1690 cm$^{-1}$, believed to be due to the amine salt of a carboxylic acid. This resin was then treated at 150° C. with a 25/75 v/v fluorine/nitrogen mixture for five hours. The final resin had an inherent viscosity of 0.41 dl/g and an acid fluoride content of 3.8 meq/kg copolymer.

To prepare optically pure copolymer, the sample was initially treated as in Example 2, with a different final step. After the copolymer solution in perfluoro(2-butyltetrahydrofuran) was concentrated to approximately 20% solids under reduced pressure, the copolymer was precipitated using petroleum ether (b.p. 30°-60° C.). The concentrated copolymer suspension (approx. 500 ml) was poured slowly with mild stirring into a 5 liter stainless steel blender containing approximately 3 liters of petroleum ether. Further copolymer precipitated as a gummy solid, and the solvent was decanted off. After adding more solvent and further stirring, the gummy solid began to break up into granular material. This copolymer sample was then washed with 50% aqueous methanol. After removing the liquid by vacuum filtration, the copolymer sample was placed in several aluminum trays and dried overnight in an air oven at 105° C. The sample was then transferred to a clean vacuum oven operated at 105° C. with nitrogen purge and was dried to a constant weight. The sample was designated Copolymer D.

EXAMPLE 4

A powdered sample of a melt-processible copolymer of TFE and perfluoro(propyl vinyl ether) (PPVE) containing 3 % PPVE and known to contain acid fluoride groups was compression molded into 0.25-0.3 mm thick films. One of these films was contacted with diethylamine for 25 hours at 20° C., and another film was contacted with a solution of 7% t-butyl alcohol in water for 34 hours at 140°-150° C. These films and an untreated film control were then exposed to 25 vol. % fluorine in nitrogen at 50° C. for one hour, then at 100° C. for two hours, and then at 145° C. for three hours. The films were analyzed by FTIR for acid fluoride functionality. The control showed the presence of 6.25 meq —COF groups per kg of copolymer, whereas the diethylamine-treated film showed no acid fluoride groups, and the t-butyl alcohol-treated film showed only 1.75 meq —COF groups per kg of copolymer. This experiment shows the advantage of the process of the present invention, as applied to a TFE/PPVE copolymer.

COMPARATIVE EXAMPLE 1

A copolymer of PDD and TFE was prepared according to the general procedure of Example 3. The copolymer was isolated by gelation with nitric acid followed by pelletization with Freon ® 113. The isolated crude copolymer was found to contain 68.8 mole % PDD; it further contained 11.7 meq —COF per kg of copolymer. The carboxylic acid index was 0.12; the Tg was 175° C., and the inherent viscosity was 1.27 dl/g. This control experiment did not give a low amount of —COF end groups.

EXAMPLE 5

Five grams of the copolymer of Comparative Example 1 was allowed to react with 100 ml t-butyl alcohol for 6 hr at 150° C. in a 240 ml steel shaker tube. After reaction, the copolymer was isolated by filtration, washed with water, and dried at 100° C. for hr. The isolated copolymer was analyzed and found to contain no —COF and no ester groups. Carboxylic acid index was 0.29. This shows that removal of —COF groups was complete, but —COOH groups remained.

The above copolymer, 4 g, was allowed to react with a fluorine/nitrogen 25/75 v/v mixture in a 320 ml Hastelloy ® shaker tube. The pressure of the fluorine/nitrogen mixture at $-30°$ C. was 517 kPa. The reaction vessel was heated to 100° C. for 1 hour, then to 150° C. for 8 hours. After reaction, the copolymer was purged to remove fluorine and found to contain 2.46 meq —COF per kg of copolymer. The carboxylic acid index was 0.0. This example shows that the copolymer of Comparative Example 1 was significantly improved with respect to —COOH and —COF group content by treatment with t-butyl alcohol followed by fluorination.

The remaining examples relate to optical fibers made from some of the polymers of this invention.

EXAMPLE 6

Copolymer B made in Example 1 was used as the cladding copolymer. This copolymer had a single Tg of 161° C. and had no first-order transition point, attributable to the presence of crystalline phase. The cladding copolymer had an inherent viscosity of 0.67 dl/g as measured at 25° C. with respect to a solution in perfluoro(2-butyltetrahydrofuran), a melt viscosity of 16,800 poise at a shear rate of 100 sec$^{-1}$ at 250° C., and a refractive index of 1.3045.

Copolymer B was dissolved in perfluoro(2-butyltetrahydrofuran) to give a solution having a copolymer concentration of 15%.

Polymethyl methacrylate, which was used as the core copolymer, was prepared as follows.

A reaction vessel provided with a spiral ribbon stirrer was directly-connected to a twin-screw vented extruder to form a continuous polymerization apparatus. A monomer mixture consisting of 100 parts of methyl methacrylate, 0.40 part of t-butyl mercaptan and 0.0015 part of di-t-butyl peroxide was continuously supplied to the reaction vessel and allowed to react at a temperature of 155° C. for an average residence time of 40 hours, producing polymethyl methacrylate.

The thus produced polymethyl methacrylate was introduced into the extruder, in which the vented barrel temperature was 240° C.; the extrusion zone temperature was 230° C.; and the pressure in the vent zone was maintained at 0.5 kPa absolute, so that volatile components were vented from the molten copolymer. The copolymer was extruded as a rod, cooled, and pelletized, and then introduced into a second vented extruder maintained at 230° C., conveyed to a gear pump, and metered to a spinning head fitted with a spinneret maintained at 230° C. and provided with an orifice of 3 mm diameter.

The extruded polymethyl methacrylate exiting the spinneret was cooled and solidified, then taken up at a speed of 5m/min, and sequentially passed through an oven at 135° C. between slow nip rolls and fast nip rolls to draw the extrudate at a draw ratio of 2.0, making a core fiber having a diameter of 980 micrometers.

The surface of the core fiber was coated with the above-mentioned 15% solution of Copolymer B by immersion, and the coated fiber was dried with hot air to obtain a clad optical fiber having an outer diameter of 1,000 micrometers.

The attenuation of the light transmission of the optical fiber was 313 dB/km at a wavelength of 650 nm. When 100 turns of the optical fiber were wound on a rod having a diameter of 10 mm, the emitted light quantity retention ratio was 60%. When the optical fiber was unwound, the emitted light quantity retention ratio was 91%. Thus, it was shown that the optical fiber had a very high resistance to bending. Therefore, it can be used in restricted spaces in which the fiber must bend sharply, for example, in copying machines and display devices.

EXAMPLE 7

Polymethyl methacrylate is prepared and extruded in the same equipment and under the same conditions as described in Example 6, except that in this case the copolymer exiting the first vented extruder is not allowed to cool and is not pelletized, but is fed directly to the gear pump and metered to a spinning head fitted with a spinneret. Polymethyl methacrylate thus is extruded into a core fiber having a diameter of 980 micrometers.

The surface of the core fiber is coated with a 15% cladding solution of Copolymer B in perfluoro(2-butyltetrahydrofuran) by passing the fiber downward through the solution in a cup with a hole in the bottom. The fiber goes through the hole with a 0.1 mm clearance, then down through a hot air oven at 100° C. to dry the coated fiber and to obtain a clad optical fiber having an outer diameter of 1,000 micrometers.

The attenuation of the light transmission of the optical fiber at 650 nm is about half that of the previous example. The emitted light quantity retention ratio is about the same as in the previous example, showing that the optical fiber has a high resistance to bending.

EXAMPLE 8

A 15% solution of Copolymer B of Example 1 in perfluoro(2-butyltetrahydrofuran) was used to coat the surface of a quartz fiber having a diameter of 200 micrometers, and the coated fiber was dried with hot air to obtain a quartz core, Copolymer B-clad optical fiber having an outer diameter of 220 micrometers. The attenuation of the light transmission of the optical fiber was 13 dB/km at a 660 nm. Heating the optical fiber in a hot air oven at 150° C. for 200 hours increased the attenuation of the light transmission to 16 dB/km. This shows that the optical fiber had good heat resistance.

This attenuation was considerably lower than the value of 113 dB/km shown in Example 11 of U.S. Patent No. 4,530,569, showing that the optical fiber of this Example was greatly superior to the prior art fiber.

EXAMPLE 9

Product D of Example 3 was used as the cladding copolymer. The copolymer had only a single Tg of 159° C. and had no first-order transition point, thus indicating the absence of a crystalline phase.

The cladding copolymer had an inherent viscosity of 0.485 dl/g as measured at 25° C. in a 0.1 g/dl solution in perfluoro(2-butyltetrahydrofuran), a melt viscosity of 9,500 poise at a shear rate of 100 sec$^{-1}$ at 250° C., and a refractive index of 1.3045.

An optical fiber was made as described in Example 6. The attenuation of the light transmission of the optical fiber was 302 dB/km at a wavelength of 650nm. When 100 turns of the optical fiber were wound on a rod having a diameter of 10 mm, the emitted light quantity retention ratio was 26%, and when the wound fiber was unwound, the emitted light quantity retention ratio was 77%.

EXAMPLE 10

An optical fiber is made as described in Example 6, except that Copolymer D of Example 3 is used as the cladding copolymer. The attenuation of the light transmission of the resulting optical fiber is about half that of the previous example at a wavelength of 650 nm. The emitted light quantity retention ratio is about the same as in the previous example, showing that the optical fiber has a high resistance to bending.

EXAMPLE 11

A polycarbonate made from bisphenol A and having a viscosity average molecular weight of 25,000 (Panlite L-1250W supplied by Teijin Kasei) was fed to a vented barrel extruder maintained at 270° C. and communicating at its downstream end with a gear pump maintained at 230° C., which in turn communicated with an extrusion zone maintained at 240° C. The copolymer thus was melted and conveyed through the gear pump to the extrusion zone and fed to the inner channel of a coextrusion head provided with two concentric extrusion channels and maintained at 250° C.

Simultaneously, molten Copolymer D of Example 3 was supplied from a second extruder to the outer channel of the coextrusion head.

Both polymers were coextruded through a spinneret provided with orifices of 4.5 mm diameter each. The thus extruded two-layer extrudate was cooled, solidified, and taken up at a speed of 5 m/min to give an optical fiber having a polycarbonate core with a diameter of 980 micrometers and a Copolymer D cladding having a thickness of 10 micrometers.

The attenuation of the light transmission of this optical fiber was 1,500 dB/km at a wavelength of 680 nm. Heating the optical fiber in an air oven at 125° C. for 100 hours increased the attenuation of the light transmission to 1,700 dB/km, while heating the optical fiber at 85° C. and a relative humidity of 95% for 100 hours increased the attenuation of the light transmission to 1,610 dB/km. This shows that the optical fiber had good heat resistance and good wet-heat resistance. Its attenuation is adequate for very short length applications such as, for example, illumination of clock dials.

EXAMPLE 12

In the same manner as described in Example 11, coextrusion was carried out at a take-up speed of 10 m/min by using Copolymer D as the cladding component and polyglutarimide prepared from polymethyl methacrylate by the method described in U.S. Pat. No. 4,693,553 and having a glutarimidization degree of 40%, which had a melt index of 5.7, a refractive index of 1.530, a specific gravity of 1.20 g/cm$^3$, and a heat distortion temperature of 147° C., as the core component. The resulting optical fiber was drawn at a temperature of 165° C. and at a draw ratio of 1.5 to obtain a clad optical fiber having a core diameter of 980 micrometers and a cladding thickness of 10 micrometers.

The attenuation of the light transmission of the optical fiber was 1,920 dB/km at a wavelength of 660 nm. After the optical fiber was held for 250 hours in a hot air constant temperature bath maintained at 135° C., the attenuation of the light transmission of the optical fiber was 1,980 dB/km. Thus, it was shown that the optical fiber had good heat stability.

EXAMPLE 13

The surface of a quartz fiber having a diameter of 200 micrometers was coated with a 20% solution of copolymer D of Example 3 in perfluoro(2-butyltetrahydrofuran), and the coated fiber was dried to obtain a Copolymer D-clad, quartz-core optical fiber having an outer diameter of 215 micrometers.

The attenuation of the light transmission of the optical fiber was 7 dB/km at 850 nm. After the optical fiber was held for 200 hours in an air oven maintained at 150° C., no change of appearance was observed, and the attenuation of the light transmission was 8 dB/km.

COMPARATIVE EXAMPLE 2

To a monomer mixture composed of 100 parts of 2,2,2-trifluoroethyl methacrylate and 1 part of methacrylic acid were added 0.01 part of n-octyl mercaptan and 0.5 part of azobisisobutyronitrile, and bulk polymerization was carried out at 70° C. for 8 hours to obtain a copolymer having a refractive index of 1.419.

A clad optical fiber was prepared in the same manner as described in Example 9, except that a solution of the so-obtained copolymer in ethyl acetate was used as the coating solution.

When 100 turns of the optical fiber were wound on a rod having a diameter of 10 nm, the emitted light quantity retention ratio was 0%. Even when the optical fiber was unwound, the light quantity recovered was only 10%.

COMPARATIVE EXAMPLE 3

A 40 % solution of a copolymer comprising 80 mole % of vinylidene fluoride and 20 mole % of tetrafluoroethylene, which copolymer had a first order transition (melting point) of 128° C., a crystallinity (measured by X-ray diffraction) of 46%, and a refractive index of 1.405, was used as the cladding copolymer solution, which was coated on a quartz fiber of a 200 micrometer diameter. A clad optical fiber having an outer diameter of 230 micrometers was made as described in Example 13.

The attenuation of the light transmission of the optical fiber was 120 dB/km at 850 nm, and leakage of light from the periphery of the optical fiber was large. When the optical fiber was heated to 150° C. as described in Example 12, the fibers adhered to one another because of melting of the cladding copolymer, and the light-transmitting capability was completely lost.

We claim:

1. An optical fiber consisting of a core and a cladding, wherein the cladding is a copolymer of tetrafluoroethylene with an amorphous, melt-processible copolymer of a fluorodioxole having the following formula

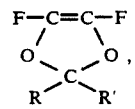

where each one of R and R' independently is fluorine or the trifluoromethyl group, with at least one comonomer selected from the group consisting of tetrafluoroethylene; chlorotrifluoroethylene; $R_fCF=CF_2$, where $R_f$ is a primary perfluoroalkyl group with 1–5 carbon atoms; $R_gOCF=CF_2$, where $R_g$ is $R_f$ or a primary perfluoroalkyl group containing ether oxygen and 4–12 carbon atoms;

said copolymer having a glass transition temperature of at least 125° C. and a —COF group content, as determined by Fourier transform infrared spectroscopy, of less than about 5 milliequivalents per kilogram of copolymer and having been thermally stabilized according to a process comprising at least one cycle of the following sequential steps:

(a) contacting said copolymer for a period of at leat 15 minutes at a temperature between about 25° C. and 200° C. with at least a stoichiometric amount, based on he concentration of —COOH and —COF groups, of an anhydrous or aqueous stabilizing agent selected from the group consisting of (1) bases selected from organic amines having a boiling point at normal pressure of at most about 130° C. and (2) tertiary alcohols with up to 8 carbon atoms, to form an intermediate;

(b) isolating and drying the intermediate at a temperature between about 70° C. and 150° C.:

(c) converting the dried intermediate to a copolymer having improved thermal stability by contacting the intermediate with fluorine at a temperature between 20° C. and the lowest temperature at which the copolymer exhibits a solid state transition, whether first order or second order, and (d) removing excess fluorine and volatile by-products from the reaction product and recovering the copolymer.

2. An optical fiber of claim 1 wherein the cladding copolymer has a —COF group content of less than about 2 milliequivalents per kilogram of copolymer.

3. An optical fiber of of claim 1 wherein the cladding copolymer has a glass transition temperature of at least 135° C.

4. An optical fiber of claim 3 wherein the cladding copolymer has a —COF gorup content of less than about 2 milliequivalents per kilogram of copolymer.

5. An optical fiber of claim 1, wherein the cladding copolymer has a glass transition temperature of at least 150° C.

6. An optical fiber of claim 5 wherein the cladding copolymer has a —COF group content of less than about 2 milliequivalents per kilogram of copolymer.

7. An optical fiber of claim 1 wherein the cladding copolymer is a copolymer of perfluoro-2,2-dimethyl-1,3-dioxole with tetrafluoroethylene which exhibits no first order transition.

8. An optical fiber of claim 7 wherein he cladding copolymer has a —COF group concentration of no more than about 2 milliequivalents per kilogram.

9. An optical fiber consisting of a core and a cladding, wherein the cladding is a copolymer of tetrafluoroethylene with perfluoro-2,2-dimethyl-1,3-dioxole which exhibits no first order transition and has been thermally stabilized according to a process comprising at least one cycle of the following sequential steps:

(a) contacting said copolymer for a period of at least 15 minutes at a temperature of about 70° C. to 200° C. with at least a stoichiometric amount, based on the concentration of —COOH and —COF groups, of an anhydrous or aqueous stabilizing agent selected from the group consisting of organic amines having a boiling point at normal pressure of at most about 130° C., to form an intermediate;

(b) isolating and drying the intermediate at a temperature between about 70° C. and 150° C.:

(c) converting the dried intermediate to a copolymer having improved thermal stability by contacting the intermediate with fluorine at a temperature between 20° C. and the lowest temperature at which the copolymer exhibits a solid state transition, and (d) removing excess fluorine and volatile by-products from the reaction product and recovering the copolymer.

10. An optical fiber of claim 9 wherein the core is glass or quartz.

11. An optical fiber of claim 9 wherein teh core is a synthetic organic material.

12. An optical fiber of claim 11 wherein the core is a polycarbonate.

13. An optical fiber of claim 12 wherein the core is poly(methyl methacrylate).

14. An optical fiber consisting of a core and a cladding, wherein the cladding is a copolymer of tetrafluoroethylene with perfluoro-2,2-dimethyl-1,3-dioxole which exhibits no first order transition and has been stabilized according to a process comprising at least one cycle of the following sequential steps:

a) contacting said copolymer for a period of at least 15 minutes at a temperature between about 40° C. below the lowest glass transition temperature and 50° C. above the lowest glass transition temperature of the copolymer with at least a stoichiometric amount, based on the concentration of —COOH and —COF groups, of an anhydrous or aqueous stabilizing agent selected from the group consisting of tertiary alcohols with up to 8 carbon atoms, to form an intermediate;

b) isolating and drying the intermediate at a temperature between about 70° C. and 150° C.:

c) converting the dried intermediate to a copolymer having improved thermal stability by contacting the intermediate with fluorine at a temperature between 20° C. and the lowest temperature at which the copolymer exhibits a solid state transition, and d) removing excess fluorine and volatile by-products from the reaction product and recovering the copolymer.

* * * * *

UNITED STATES PATENT AND TRADEMARK OFFICE
CERTIFICATE OF CORRECTION

PATENT NO. : 5,076,659
DATED : December 31, 1991
INVENTOR(S) : Paul G. Bekiarian
Marlin D. Buckmaster
Richard A. Morgan It is certified that error appears in the above-identified patent and that said Letters Patent is hereby corrected as shown below:

Please correct Claim 1 as follows:

In col. 18, line 59, delete "a copolymer" and insert in lieu thereof the expression --an amorphous, melt-processible copolymer--;

In col. 18, lines 61 and 62, delete "an amorphous, melt-processible copolymer of";

In col. 19, line 17, change "leat" to --least--.

Please correct Claim 11 as follows:

In col. 20, line 29, change "teh" to --the--.

Signed and Sealed this

Thirteenth Day of April, 1993

Attest:

STEPHEN G. KUNIN

Attesting Officer     Acting Commissioner of Patents and Trademarks